May 29, 1934.                 W. B. GRAY                1,960,488
FISH LURE
Filed June 27, 1933
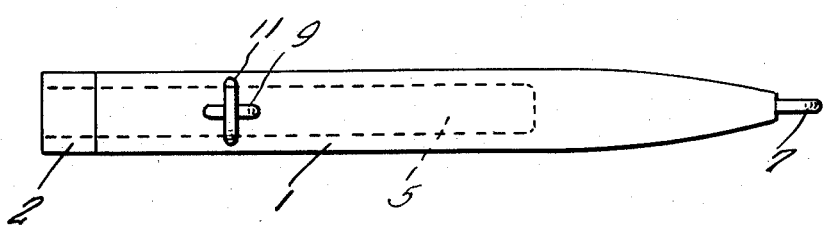
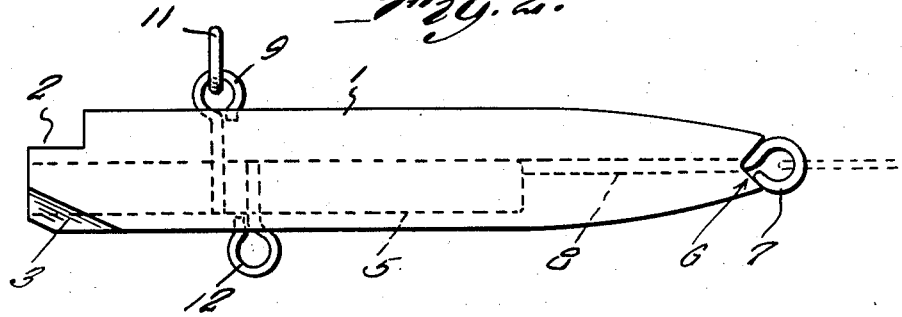
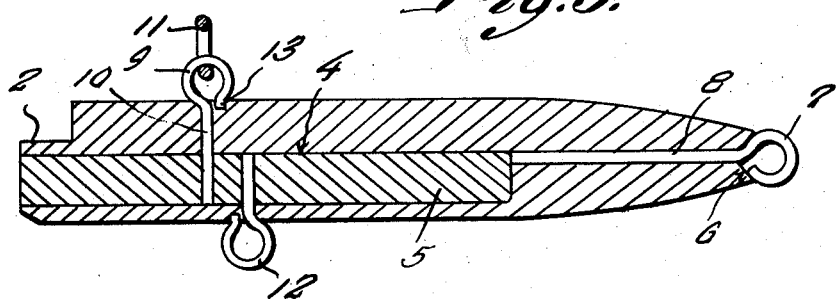
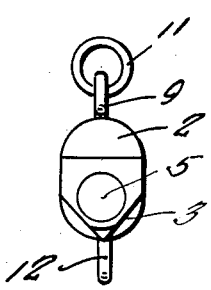
Inventor
W. B. Gray
By Clarence A. O'Brien
Attorney Patented May 29, 1934

1,960,488

UNITED STATES PATENT OFFICE 1,960,488

FISH LURE

William B. Gray, Palm Beach, Fla.

Application June 27, 1933, Serial No. 677,939

2 Claims. (Cl. 43—46)

This invention relates to a fish lure, the general object of the invention being to provide means whereby the lure can be given a wiggling motion sidewise by pulling upon the line and the lure will sink rapidly head downwardly and with a wiggling motion when the line is slacked.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a top plan view of the invention.

Figure 2 is a side view thereof.

Figure 3 is a longitudinal sectional view.

Figure 4 is a front view.

In these views, the body of the lure is shown at 1 and can be formed of any suitable material and said body is preferably formed with rounded upper and lower edges and flat side edges, as shown in Figure 4, with the rear part of the body tapering to the rear end thereof. The front end of the body is formed with a recess 2 in its upper part and said front end at its bottom part is of V-shape, as shown at 3, with the V-shaped part sloping downwardly and rearwardly, as shown in Figure 2. A bore 4 extends from the front end of the body to an intermediate part thereof and a weight 5 is forced into said bore. A V-shaped recess 6 is formed in the rear end of the body to partly receive an eye 7, the shank 8 of which extends through the rear part of the body to the weight and is held in place by friction or in any other suitable manner. The eye is adapted to receive a hook or a number of hooks and by providing the recess 6, the hook is prevented from tilting too far forwardly, thus preventing fouling of the line or the throat of the hook. An upper eye 9 has its shank 10 passing through a vertical hole in the upper part of the body and through a hole in the weight and a ring 11 engages the eye and is adapted to receive the line. A second hook 12 has its shank passing upwardly through a hole in the lower part of the body and through a hole in the weight and both of these eyes have beak parts 13 extending into small holes in the body so that the eyes are prevented from turning.

A slight pull on the line attached to the ring 11 will give the device a wiggling motion sidewise and the resistance offered by the recess 2 increases this wiggling motion and when the line is slacked, the V-shaped part 3, together with the weight 5, causes the device to sink rapidly, head downwardly, and right side up, and with a wiggling motion. By attaching the line to the ring 11 and placing the ring in the eye 9, the device can wiggle freely without resistance from the line.

The device, when cast or trolled, will dive and wiggle in the water and the device can be used for both fresh and salt water fish. It is primarily an under-water bait, as it will not float. One or more hooks can be attached to the eye 12, if desired.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A lure of the class described comprising an elongated body having a tapered rear end, the major portion of the body having substantially straight sides and rounded top and bottom portions, the front end of the body having a V-shaped lower part sloping downwardly and rearwardly and the upper portion of said front end having a recess therein, an elongated weight in the body extending from the front end to an intermediate part thereof and located adjacent the lower part of the body, an eye connected to the top part of the body an appreciable distance from the front end thereof, to which eye a line is adapted to be connected, said weight, the V-shaped lower portion at the front end of the body and the recess causing the lure to sink rapidly head down, right side up, with wiggling motions, when the line is slack, and means for attaching a hook to the body.

2. A lure of the class described comprising an elongated body having a tapered rear end, the major portion of the body having substantially flat sides and rounded upper and lower portions, the front end of the body having its lower part of V-shape, which slopes downwardly and rearwardly, and said front end having a recess in its upper portion, the rear wall of which is arranged at right angles to the axis of the body, an elongated weight in the body extending from the front end to an intermediate part of the body and located adjacent the lower portion of the body, an eye member vertically arranged in the body, with the eye part extending from the top portion of the body an appreciable distance from the front end thereof, the shank of the eye member engaging a portion of the weight, a ring in the eye for receiving a line, a second eye member having its eye portion extending from the lower portion of the body with its shank engaging a part of the weight, said second eye member also being located an appreciable distance from the front end of the body, the rear end of the body having a horizontally arranged V-shaped recess therein and a hook receiving eye partly located in said recess.

WILLIAM B. GRAY.